No. 696,036. Patented Mar. 25, 1902.
C. GLOVER.
COASTER BRAKE OR THE LIKE.
(Application filed Oct. 1, 1901.)
(No Model.)
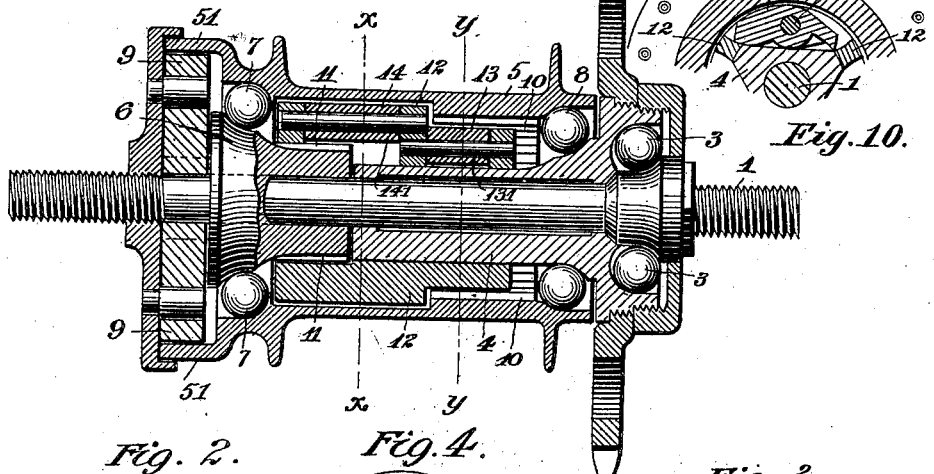
Fig. 1. Fig. 10.
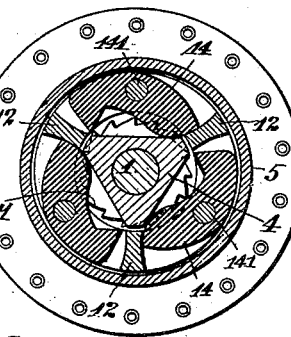 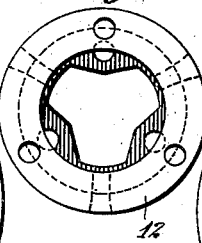 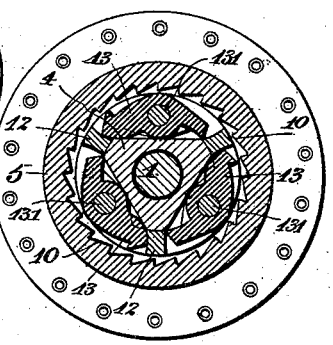
Fig. 2. Fig. 4. Fig. 3.
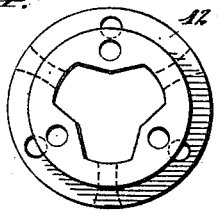 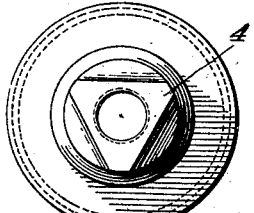 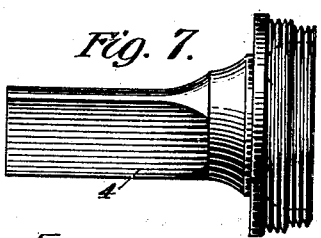
Fig. 4.ᵃ Fig. 6. Fig. 7.
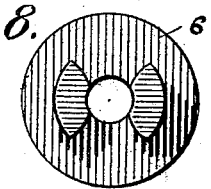 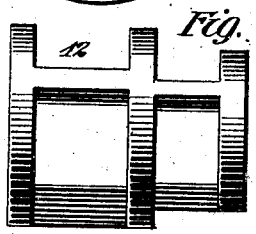 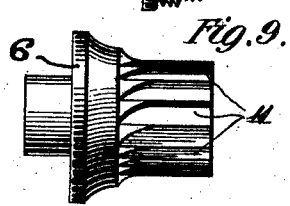
Fig. 8. Fig. 5. Fig. 9.
Witnesses
Inventor:—
Charles Glover,
By his Attorney

UNITED STATES PATENT OFFICE.

CHARLES GLOVER, OF NEW BRITAIN, CONNECTICUT, ASSIGNOR TO P. & F. CORBIN, OF NEW BRITAIN, CONNECTICUT, A CORPORATION OF CONNECTICUT.

COASTER-BRAKE OR THE LIKE.

SPECIFICATION forming part of Letters Patent No. 696,036, dated March 25, 1902.

Application filed October 1, 1901. Serial No. 77,190. (No model.)

*To all whom it may concern:*

Be it known that I, CHARLES GLOVER, a citizen of the United States, residing at New Britain, Hartford county, State of Connecticut, have invented certain new and useful Improvements in Coaster-Brakes or the Like, of which the following is a full, clear, and exact description.

My invention relates to power-transmitting and brake mechanism, and I shall describe it particularly as applied to that class of devices termed "coaster-brakes" for cycles and the like.

The invention involves certain fundamental features illustrated and described herein; and the object is to provide a simple, efficient, and durable mechanism whereby the driving-wheel may be connected or disconnected with the source of power or connected or disconnected with the brake mechanism, so that the said wheel may be controlled at will.

One of the objects which I seek to accomplish is to do away with the mechanism which, by being shifted longitudinally upon the axis of the wheel, throws in friction-clutch devices provided for the purpose of clutching the driver with either the driving-wheel or the brake, since it has been found that many of such devices are liable to jam, and thus either fail to operate altogether or be slow in the response to the will of the rider. By this mechanism the employment of a shifting device is eliminated and the "driver," so called, may be coupled with either the wheel or with the brake mechanism or disconnected from both instantly.

In the accompanying drawings, Figure 1 is a longitudinal sectional view. Fig. 2 is a section on the line X X, Fig. 1. Fig. 3 is a section on the line Y Y, Fig. 1. Figs. 4 and 4ª are end elevations of a detail of construction. Fig. 5 is a side elevation of the detail shown in Figs. 4 and 4ª. Figs. 6 and 7 are respectively an end and side elevation of the driver; and Figs. 8 and 9 are respectively an end and side elevation of a portion of the brake-actuating mechanism. Fig. 10 is a detail of a modification.

The following detailed description relates particularly to the preferred form of my invention, which, it is obvious, is susceptible of a variety of modifications without departing from the spirit and scope of my invention.

1 is a main shaft or axle.

2 is a gear or sprocket wheel, the direction of rotation of which is controllable by the rider. The sprocket or driver 2 is mounted in such manner that it may rotate freely upon the axle 1, for example, by means of suitable antifriction-bearings 3.

4 is a hub projecting from the driver 2. The driver-hub 4 is shouldered, for example, by providing angular faces which serve as cams for the purpose hereinafter described.

5 is a wheel-hub.

6 is a brake-actuator, which is mounted loosely upon the axle 1, and is so shaped that it may afford one of the bearing-surfaces for the antifriction-balls 7, supporting one end of the wheel-hub 5.

8 represents antifriction-balls, which may be provided between the wheel-hub 5 and the driver-hub 4 to afford a bearing for the other end of the hub.

9 9 are brakes adapted to engage with the wheel-hub 5 or an extension 51 thereon. The particular form of the brakes 9 9 is immaterial, as is also the number of brakes employed. The brake is applied by means of the brake-actuator 6, which by being turned in one direction serves to throw the brake-shoes against the hub extension 51 in the specific form shown.

10 represents teeth on the inside of the wheel-hub 5.

11 represents teeth on the outer surface of the brake-actuator 6.

12 is a frame, for example, such as shown in Figs. 4, 4ª, and 5. This frame serves to support the hooks or pawls 13 14, which are pivotally mounted within the wheel-hub 5, and adapted to respectively engage the driver-hub with the wheel-hub 5 or the brake-actuator 6 when said driver is moved in the proper direction. The hooks 13 and 14 are preferably pivoted intermediate their length, so that the forward ends carrying the hook proper, as shown in Figs. 2 and 3, may be tilted into or out of engagement with the ratchet-teeth with which they are adapted to coöperate.

Referring particularly to Fig. 2, it will be seen that the driver-hub 4 if turned in an opposite direction to the hands of a watch engages with the rear end of the pawl 14 and throws the opposite or hooked end into engagement with the ratchet-teeth 11 on the brake-actuator. Consequently a continued rearward movement of the driver-hub 4 will transmit a similar movement to said brake-actuator, which movement throws the brake-shoe 9 into engagement with the wheel-hub or the extension 51 thereof, causing it to be slowed down or stopped at will. As soon as the direction of rotation of the driver is reversed—i.e., as soon as it is turned clockwise—the pawls 14 are tilted so that the hooks are thrown out of engagement with the ratchet-teeth 11 and the brake-actuator is freed. The continued clockwise movement of the driver-hub 4 causes it to engage with the pawls 13, (see Fig. 3,) throwing the hooked ends of the pawls into engagement with the ratchet-teeth 10 of the wheel-hub. Consequently a further continuance of the clockwise movement of the driver imparts a similar movement to the wheel-hub 5, the pawls 13 acting as the connecting means. When the driver-hub 4 is connected with the wheel-hub 5, it will be seen that the strain is taken directly through the end of each of the pawls 13 to and against the driver-hub without passing through the pivotal connection 131 of said pawls, thereby relieving the pivot of any strain and effecting a positive and firm connection. This construction is preferred, because the greatest strains are produced when the wheel is being driven ahead. The strain upon the apparatus when the brake is applied is materially less, and consequently there is no decided advantage in relieving the pivot-pins 141 of the burden of holding the pawls 14.

In Figs. 2 and 3 the parts are illustrated in the position in which the wheel-hub is free to be rotated either forwardly or backwardly; but when the driver-hub 4 is shifted out of the position shown in Figs. 2 and 3 in either direction one or the other sets of pawls 13 14 will be thrown into operative engagement with the wheel-hub 5 or the brake-actuator 6, respectively. The frame 12 manifestly turns with the driver; but the driver is capable of having limited rotative movement therein for the purpose of actuating either set of pawls. To that end, therefore, it is preferable to have a passage, such as shown in Fig. 4, through the frame 12 of the proper dimensions to permit this limited independent rotative movement of the part 4 relatively to the part 12.

By the above means no longitudinally-shifting devices are needful, nor are any friction-clutches necessary to effect engagement between the driver-hub 4, the wheel-hub 5, or the brake-actuator 6; but the parts may be instantly coupled or uncoupled without danger of failure to act or delay in action of the coupling devices. The doing away of the lateral shifting device permits of a more compact construction, and thereby contributes an added advantage to the subject-matter of this invention.

A feature of importance in this case is that when one set of pawls is acting it is impossible to move the other pawls so as to throw them into engagement with the teeth with which they are intended to coact at the proper time. For example, referring to Fig. 2, it will be seen that when the driver-hub 4 is turned clockwise the same will stand underneath the inside of the bill of the hook on pawl 14 and prevent it from being moved into such a position as to engage with the teeth 11. Referring to Fig. 3, it will be seen that the rear end of each of the levers or pawls 13 is cut out, so that when the driver-hub 4 is moved in a reverse direction to the hands of a clock the said driver will stand under said arms, preventing the tilting of the same, and thus preventing the bill of the hook from engaging with the teeth 10 on the wheel-hub 5 so long as the driver is in this position. The pawls are preferably provided with hooks, as shown in the drawings and as described; but obviously the hooks on the pawls might be dispensed with and the teeth on the parts with which the pawls are to be engaged might be omitted, so that a wedging engagement might be effected instead of a hook engagement—as, for instance, shown in Fig. 10, in which the pawl 132 is adapted for frictional engagement with the adjacent part.

Manifestly the drawings are illustrative rather than definitive and that changes in proportion and particular arrangement may be made without departing from the spirit and scope of the invention.

What I claim is—

1. In a device of the character described, an axle, a driver, an extension therefrom, a wheel-hub, a brake adapted to act upon the wheel-hub, a brake-actuator, teeth on the brake-actuator and upon said wheel-hub, and a pawl between the brake-actuator and the driver extension, and an oppositely-arranged pawl between the wheel-hub and the driver extension, a frame carrying said pawls said frame having limited rotative movement relatively to said driver.

2. In a device of the character described, an axle, a driver, an extension therefrom, a wheel-hub, a brake adapted to act upon the wheel-hub, a brake-actuator, teeth on the brake-actuator and upon said wheel-hub, and pivoted pawls between the brake-actuator and the driver extension and between the wheel-hub and the driver extension, said pawls being oppositely arranged, a frame carrying said pawls, said frame having limited rotative movement relatively to said driver.

3. In a device of the character described, a wheel-hub, a brake therefor, means for operating the brake, a driver, an extension therefrom, and oppositely-arranged pawls operated by said extension, a frame carrying said pawls, said frame having limited rotative movement relatively to said driver extension.

4. In a device of the character described, a wheel-hub, a brake therefor, means for operating the brake, a driver, an extension therefrom, said extension having flat bearing-faces, a frame mounted upon said driver extension adjacent to said flat bearing-faces, said frame having limited rotative movement relatively to said driver extension, and two oppositely-arranged sets of pawls carried by said frame, one set being located between said driver extension and said wheel-hub, the other set being located between said driver extension and said brake-operating means.

5. A coaster-brake comprising a wheel-hub, a brake-actuator, a driver, means located between said parts whereby by radial action controlled by the rotation of the driver either the wheel-hub or the brake-actuator may be connected or disconnected with said driver, a frame carrying said connecting and disconnecting means, said frame having limited rotative movement relatively to said driver.

Signed at New Britain, Connecticut, this 18th day of September, 1901.

CHARLES GLOVER.

Witnesses:
   CHARLES H. PARSONS,
   ALBERT N. ABBE.